United States Patent Office 3,148,204
Patented Sept. 8, 1964

3,148,204
HALOGENATED ETHER CYANO ESTERS
Lee A. Miller, Kirkwood, Mo., assignor to Monsanto
Company, a corporation of Delaware
No Drawing. Filed Nov. 15, 1961, Ser. No. 152,615
4 Claims. (Cl. 260—465)

This invention relates to unsaturated esters, to methods for preparing them, and to the uses thereof in biological toxicants compositions, for example, in herbicidal compositions.

It is an object of this invention to provide new biologically active cyanoalkyl haloaryloxyacrylates. Another object of this invention is to provide cyanoalkyl haloaryloxyacrylates as new compounds. Another object of this invention is to provide a method for preparing cyanoalkyl haloaryloxyacrylates. Another object of this invention is to provide harbicidal compositions containing at least 1 cyanoalkyl haloaryloxyacrylate. It is a further object of this invention to provide methods for controlling the growth of undesired plant life by the application to the seeds of such undesired plants a toxicant composition containing as an essential active ingredient at least one cyanoalkyl haloaryloxyacrylate compound. Other objects, aspects, and advantages of the invention are apparent from a consideration of the accompanying disclosure and the appended claims.

According to this invention, cyanoalkyl haloaryloxyacrylates are prepared by reacting a halogenated phenolic compound containing from 1 to 5 halogen atoms in the molecule, said halogen atoms being selected from the group consisting of chlorine, bromine, and iodine, with a cyanoalkyl propiolate having from 2 to 6 carbon atoms in the alkyl portion of the cyanoalkyl radical, in the presence of a basic catalyst.

Thus, the present invention provides compounds of the formula

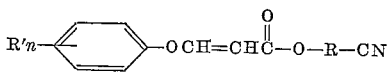

wherein R is a bivalent alkylene radical of from 2 to 6 carbon atoms, R' is a halogen selected from the group consisting of chlorine, bromine, and iodine, and $n$ is an integer of from 1 to 5.

Further, according to the present invention, there are provided biological toxicant compositions, for example, a herbicidal composition containing a carrier adjuvant and as an essential active ingredient a lethal amount of at least 1 cyanoalkyl haloaryloxyacrylate having the above generic formula.

Further according to the present invention there are provided methods for controlling undesired plant life, by the application to the seeds of such undesired plant life a toxic composition containing as an essential active ingredient at least one cyanoalkyl haloaryloxyacrylate compound.

The cyanoalkyl propiolates which are employed for the preparation of the present cyanoalkyl haloaryloxyacrylates are obtained by the reaction of a cyanoalkanol with propiolic acid or an acyl halide or an anhydride thereof, the reaction with, for example, propiolyl chloride proceeding as follows:

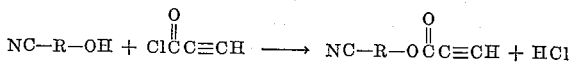

in which R is a bivalent alkylene radical of from 2 to 6 carbon atoms, as described in my copending application S.N. 80,027, filed January 3, 1961, now Patent No. 3,078,-210. Examples of cyanoalkyl propiolates and the cyanoalkanols from which they are prepared are:

2-cyanoethyl propiolate from hydracrylonitrile;

2-cyano-1-methylethyl propiolate from 3-hydroxybutyronitrile;
3-cyanopropyl propiolate from 4-hydroxybutyronitrile;
2-cyano-1,1-dimethylethyl propiolate from 2,2-dimethylhydracrylonitrile;
4-cyanobutyl propiolate from 5-hydroxyvaleronitrile;
2-cyano-1-ethylethyl propiolate from 3-hydroxyvaleronitrile;
5-cyanopentyl propiolate from 6 hydroxyhexanenitrile;
4-cyano-1-methylbutyl propiolate from 5-hydroxyhexanenitrile; and
6-cyanohexyl propiolate from 7-hydroxyheptanenitrile.

Suitable halogenated phenolic compounds that may be reacted with a cyanoalkyl propiolate of the above defined types to produce the compounds of their invention include the isomeric monochlorophenols, isomeric monobromophenols, and the isomeric monoiodophenols, 2,4-dichlorophenol, 2,5-dichlorophenol, 2,6-dichlorophenol, 2,4,5-trichlorophenol, 2,4-dibromophenol, 2,4,5-tribromophenol, 2,4,6-trichlorophenol, 2,4-diiodophenol, pentachlorophenol, pentabromophenol. To prepare the compounds of this invention it is essential that there be at least one halogen substituent attached to the phenolic nucleus.

Within the broad scope of the present discovery, I have found that I can prepare cyanoalkyl 3-(halo-substituted aryloxy)acrylates by the reaction of a cyanoalkyl propiolate with a halophenol containing additional substituents attached to the aromatic nucleus, for example, the isomeric monochlorocresols, the isomeric monobromocresols, and the isomeric monoiodocresols. Other substituted phenols suitable for use in the preparation of these compounds include 2-chloro-4-tertiary-butylphenol, 3-bromo-4-hexylphenol, 2-iodo-4-dodecylphenol, 3-chloro-4-tetradecylphenol, 2-chloro-3-nitrophenol, 2-bromo-6-nitrophenol, 2,4-dichloro-6-nitrophenol, 2,4,5-triiodo-3-nitrophenol, etc.

The present compounds are for the most part solid crystalline materials. These compounds can be used for a variety of chemical and industrial purposes. As will be shown hereinafter, the present cyanoalkyl 3-(halo-substituted aryloxy)acrylates are characterized by high biological toxicant activities, specifically against various undesired types of plant life and hence are effective herbicidal chemicals. Compounds produced by the practice of my process can be used as monomers to prepare novel polymeric materials suitable for a wide variety of applications such as for fibers, films, moldings, and castings. By the practice of this invention it is possible to synthesize monomeric materials which can be converted to polymers having biological toxicant activity. These materials when added to soil for use as herbicides or for use as specific plant toxicants have the added feature of having an abnormally slow decomposition rate so that they have a comparatively long effective life. Many of these compounds produced by the process of this invention have unusual activity as selective herbicides when used in the monomeric form.

In preparing the present compounds from cyanoalkyl propiolates, a compound containing a phenolic hydroxyl group is contacted with a cyanoalkyl propiolate at room temperature or at a slightly elevated temperature in the presence of an alkaline catalyst at atmospheric pressure or at an elevated pressure until formation of the desired cyanoalkyl 3-aryloxyacrylate has occurred. The desired product is formed by the stoichiometric addition of one mole of the compound containing the phenolic hydroxyl group to one mole of the cyanoalkyl propiolate; accordingly, the present reaction is preferably carried out by contacting equimolar quantities of each of said reactants.

If desired an excess of the more readily available reaction component can be utilized.

To catalyze this addition reaction, there is used an alkaline catalyst. Since the reaction proceeds at a fairly rapid rate under the very mild alkaline condition, only trace quantities of a strongly basic compounds need be used. If desired, weakly basic catalyst can be used. Examples of such alkaline catalyst are the alkali metals such as sodium or potassium; the oxides and hydroxides of alkali and alkaline earth metals such as sodium hydroxide, calcium oxide, magnesium oxide, barium oxide; the alkali metal alcoholates such as sodium methylate or sodium ethylate; the alkali and alkaline earth metal salts of organic acids such as sodium acetate, potassium laurate, etc. Alternatively, in place of an alkaline salt of an alkaline metal, etc. an alkaline-reacting organic base such as a tertiary amine or a quaternary ammonium hydroxide compound can be used. For example, we can use trimethyl amine, tripropyl amine, dimethyl cyclohexyl amine, dimethyl aniline, etc. Examples of suitable quaternary, ammonium hydroxides are: choline, [trimethyl(hydroxyethyl)ammonium hydroxide], Triton B (benzyltrimethylammonium hydroxide), octadecyldiethylmethylammonium hydroxide, etc.

If desired a solvent or diluent can be used in the reaction mixture. Examples of suitable diluents which can be used when desired are liquid organic compounds which are free of active hydrogen, such as benzene, dioxane, hexane, ethyl ether, dimethylsulfoxide, etc. I prefer to use an inert aromatic or aliphatic hydrocarbon as a diluent.

In order to obtain useful yields of the present reaction products within feasible reaction times, the reaction of the cyanoalkyl propiolate with halogenated compound containing a phenolic hydroxyl should be carried out at room temperature or at slightly elevated temperature. The reaction temperatures at which reaction proceeds at a desirable rate are on the order of from about 20° C. up to below the decomposition temperature of the reactant. Particularly preferable are temperatures of from 20° C. to 150° C. although we can use temperatures as low as −50° C. but at a sacrifice in reaction speed.

While batch operations are described in the following examples, with suitable choice of apparatus, it is possible to operate the present process continuously, and thereby yields up to quantitative can be obtained. Thus, a cyanoalkyl propiolate and a compound containing a phenolic hydroxyl can be injected into a heated tubular reactor wherein a superatmospheric pressure is maintained, a product cyanoalkyl 3-aryloxyacrylate being isolated from the resulting reaction, while unreacted cyanoalkyl propiolate and said phenolic compound are recycled to undergo further reaction.

Examples of compounds within the scope of this invention and the reactants from which they are obtained are, for example, 2-cyanoethyl 3-(4-chlorophenoxy)acrylate from 2-cyanoethyl propiolate and 4-chlorophenol;

3-cyanopropyl 3-(2,4,5-tribromophenoxy)acrylate from 3-cyanopropyl propiolate and 2,4,5-tribromophenol;

4-cyanobutyl 3-(pentachlorophenoxy)acrylate from 3-cyanobutyl propiolate and pentachlorophenol;

5-cyanopentyl 3-(2,4-diiodophenoxy)acrylate from 5-cyanopentyl propiolate and 2,4-diiodophenol;

6-cyanohexyl 3-(2,3,4,6-tetrachlorophenoxy)acrylate from 6-cyanohexyl propiolate and 2,3,4,6-tetrachlorophenol;

2-cyanoethyl 3-(pentachlorophenoxy)acrylate from 2-cyanoethyl propiolate and pentachlorophenol;

3-cyanopropyl 3-(2,4,6-triiodophenoxy)acrylate from 3-cyanopropyl propiolate and 2,4,6-triiodophenol; and 2-cyanoethyl 3-(pentabromophenoxy)acrylate from 2-cyanoethyl propiolate and pentabromophenol.

Other useful compounds within the scope of this invention are those obtained from cyanoalkyl propiolates and halophenols containing additional substituents attached to the aromatic nucleus, for example;

2-cyanoethyl 3-(4-chloro-2-methylphenoxy)acrylate from 2-cyanoethyl propiolate and 4-chloro-2-methylphenol;

3-cyanopropyl 3-(2-chloro-4-tert-butylphenoxy)acrylate from 3-cyanopropyl propiolate and 2-chloro-4-tert-butylphenol;

6-cyanohexyl 3-(3-bromo-4-dodecylphenoxy)acrylate from 6-cyanohexyl propiolate and 3-bromo-4-dodecylphenol;

4-cyanobutyl 3-(2-chloro-4-nitrophenoxy)acrylate from 4-cyanobutyl propiolate and 2-chloro-4-nitrophenol; and 2-cyanoethyl 3-(2,4,5-triiodo-3-nitrophenoxy)acrylate from 2-cyanoethyl propiolate and 2,4,5-triiodo-3-nitrophenol.

In order to illustrate some of the various aspects and advantages of the invention, illustrative examples are given herein. It will, of course, be understood that variations in the particular phenolic compounds, reaction proportions, temperatures, pressures, and the like can be made without departing from the scope of the invention.

*Example 1*

2-cyanoethyl propiolate was prepared as follows:

A mixture consisting of 14.2 grams (0.2 mole) of hydracrylonitrile, 15.4 grams (0.22 mole, 10% excess) of propiolic acid, 0.5 g. of 4-toluenesulfonic acid and 150 ml. of benzene was stirred at reflux under a Dean-Stark apparatus for 4.5 hours. During this time 3.4 ml. (95% of theory) of water had collected. The reaction mixture was allowed to cool and then washed with 10% aqueous sodium bicarbonate and water. It was evaporated to remove solvent and subsequently distilled to give the substantially pure 2-cyanoethyl propiolate, B.P. 127° C./25 mm., $n_D^{25}$ 1.4500, which analyzed as containing 58.32% carbon and 4.34% hydrogen as compared with 58.53% carbon and 4.09% hydrogen, the calculated values. Infrared analysis showed the following structures:

$\equiv$CH at 3300 cm.$^{-1}$
CH$_2$ at 3000 cm.$^{-1}$
C$\equiv$N at 2260 cm.$^{-1}$
C$\equiv$CH at 2120 cm.$^{-1}$
C$=$O at 1725 cm.$^{-1}$
C—O—ester at 1240 cm.$^{-1}$ A mixture of 6.15 grams of 2-cyanoethyl propiolate (0.05 mole), 8.15 g. of 2,4-dichlorophenol (0.05 mole), 100 ml of benzene, and 5 drops of N-methylmorpholine was heated to reflux for 12 hours. The resulting reaction mixture was evaporated to give 15.8 g. of crude 2-cyanoethyl 3-(2,4-dichlorophenoxy)acrylate. This product was purified by recrystallization from ethanol to obtain a pure product, M.P. 63–64° C. which analyzed as containing 50.58% carbon and 3.30% hydrogen as compared with 50.37% carbon and 3.17% hydrogen for $C_{12}H_9Cl_2NO_3$. Infrared analysis of the product was as follows:

Cm.$^{-1}$:

| | Function indicated |
|---|---|
| 2,270 | C$\equiv$N. |
| 1,725 | C$=$O ester. |
| 1,652 | C$=$C. |
| 1,268 | C—O—ether. |
| 1,250 | C—O—C. |
| 1,112 | C—Cl. |
| 705 | 1 adjacent hydrogen on the phenyl ring. |
| 865 | |
| 818 | 2 adjacent hydrogens on the phenyl ring. |

The infrared results are consistent with the proposed structure of 2-cyanoethyl 3-(2,4-dichlorophenoxy)acrylate.

Example 2

This example shows evaluation of the 2-cyanoethyl 2-(2,4-dichlorophenoxy)acrylate of Example 1 as a selective preemergent herbicide. Briefly, the chemical is applied in spray form to soil seeded with representative grasses and broad-leaf plants.

Aluminum pans were filled level with a good grade of top soil which had been screened through a ¼″ wire mesh. The soil surface was then compacted to a depth of ⅜″ from the top of the pan. A predetermined number of seeds each of morning glory, wild oat, brome grass, foxtail, crab grass, rye grass, radish, sugar beet, soybean, wild buckwheat, tomato, sorghum and pigweed were scattered on the soil surface and covered with soil to the pan top.

The planted pans, except for controls, were sprayed with an aliquot of an organic solvent containing the chemical to be tested. The tests were made at the rate of 5 lbs. per acre. After spraying, the pans were placed on sand in a bench in the greenhouse and the bench flooded with water to ½″ above the sand level. The test pans of soil were allowed to absorb moisture through the perforated bottom until the surface was about ½ moist. The excess water was then drained off below the bench sand level. The surface of the test pans rapidly became completely moist by capillary action and was maintained adequately wet by sub-irrigation for the two week test period.

Observation of the pans at the end of that time showed that those which had been sprayed with the solution of the 2-cyanoethyl 3-(2,4-dichlorophenoxy)acrylate at a rate of 2 pound/acre showed complete suppression of brome grass, foxtail, crab grass, pigweed and sorghum. Suger beets, soybean, and tomato were not at all injured, whereas wild oat, radish, wild buckwheat, showed from slight to moderate injury. On the other hand, the seeds which had been planted in the pan that had not been sprayed with the present test compound had emerged and the plants were in excellent condition.

In subsequent tests, the concentration of the test compound was progressively decreased to as little as ¼ of a pound per acre. At this concentration the foxtail, crab grass and pigweed failed to emerge, whereas morning glory, sugar beet, wild oat, brome grass, rye grass, radish, soybean, wild buckwheat, tomato and sorghum were not at all effected. The 2-cyanoethyl 3-(2,4-dichlorophenoxy)acrylate thus was selective at the low concentration; moreover, at the low concentration it inhibited germination of crab grass while not affecting the other grasses.

The present cyanoalkyl 3-aryloxy acrylates are characterized by a high degree of efficacy in that they possess selective preemergent herbicidal efficacy at very low concentrations. Herbicidal compositions containing the present compounds as essential active ingredients are advantageously formulated by first preparing a solution thereof in an organic solvent and then adding the resulting solution to water containing a herbicidal adjuvant, such as an emulsifying agent to form an oil-in-water emulsion. Emulsifying agents which may be employed are those customarily used in the art for the preparation of oil-in-water emulsions, e.g., the higher alkylbenzene-sulfonates, the long chained polyalkylene glycols, the long chained alkylsulfosuccinates etc.

While the present compounds are most advantageously employed as herbicides and as other biological toxicants by incorporating them into emulsion compositions as herein described, they may also be incorporated into solid carriers such as clay, talc, pumice or bentonite to give wettable powder or dust compositions which may be applied either to infested areas or to locale which may be subject to infestation. They may also be dissolved in liquefied gases such as the fluorochloroethanes or methyl chloride and applied from aerosol bombs containing the solution.

I claim:

1. A compound of the formula

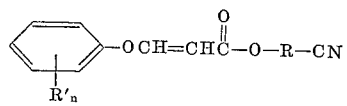

wherein R is a bivalent alkylene radical of from 2 to 6 carbon atoms, R' is a halogen selected from the group consisting of chlorine, bromine, and iodine, and $n$ is an integer of from 1 to 5.

2. A compound of the formula

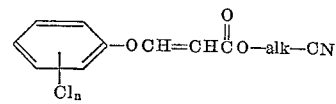

wherein alk is a bivalent alkylene radical having from 2 to 6 carbon atoms, and $n$ is an integer of from 1 to 5.

3. A compound of the formula

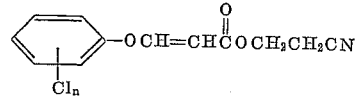

wherein $n$ is an integer of from 1 to 5.

4. 2-cyanoethyl 3-(2,4-dichlorophenoxy)acrylate.

References Cited in the file of this patent

UNITED STATES PATENTS

| | | |
|---|---|---|
| 2,280,792 | Bruson | Apr. 28, 1942 |
| 2,421,837 | Hardman | June 10, 1947 |